(12) United States Patent
Mantovani

(10) Patent No.: US 12,214,713 B2
(45) Date of Patent: Feb. 4, 2025

(54) TONNEAU COVER FIXING AND ASSEMBLY SYSTEM

(71) Applicant: KEKO ACESSÓRIOS S/A, Caxias do Sul (BR)

(72) Inventor: Juliano Scheer Mantovani, Caxias do Sul (BR)

(73) Assignee: KEKO ACESSÓRIOS S/A, Caxias do Sul (BR)

( * ) Notice: Subject to any disclaimer, the term of this patent is extended or adjusted under 35 U.S.C. 154(b) by 0 days.

(21) Appl. No.: 17/770,608

(22) PCT Filed: Jun. 17, 2021

(86) PCT No.: PCT/BR2021/050263
§ 371 (c)(1),
(2) Date: Apr. 20, 2022

(87) PCT Pub. No.: WO2022/261732
PCT Pub. Date: Dec. 22, 2022

(65) Prior Publication Data
US 2024/0140298 A1    May 2, 2024

(51) Int. Cl.
*B60P 7/04*    (2006.01)
*B60J 7/19*    (2006.01)

(52) U.S. Cl.
CPC ............ *B60P 7/04* (2013.01); *B60J 7/198* (2013.01)

(58) Field of Classification Search
CPC ....... B60J 7/198; B60J 7/19; B60J 7/10; B60J 7/02; B60J 7/102; B60J 7/104; B60J 7/141; B60J 7/185; B60J 7/068; B60J 7/04; B60P 7/04

USPC ............ 296/100.01, 100.16, 100.07, 100, 18
See application file for complete search history.

(56) References Cited

U.S. PATENT DOCUMENTS

| 5,460,423 | A | * | 10/1995 | Kersting | .................. | B60J 7/104 |
| | | | | | | 296/100.18 |
| 5,788,315 | A | * | 8/1998 | Tucker | ..................... | B60J 7/102 |
| | | | | | | 160/395 |
| 6,053,558 | A | * | 4/2000 | Weldy | ...................... | B60J 7/102 |
| | | | | | | 160/381 |

(Continued)

FOREIGN PATENT DOCUMENTS

| AU | 2021275446 A1 | 12/2021 |
| BR | MU8103687 Y1 | 10/2016 |

(Continued)

*Primary Examiner* — Amy R Weisberg
*Assistant Examiner* — Veronica M Shull
(74) *Attorney, Agent, or Firm* — Pilloff Passino & Cosenza LLP; Rachel K. Pilloff; Sean A. Passino

(57) ABSTRACT

The tonneau cover fixing and assembly system, object of the present invention, comprises a tonneau cover fixing and assembly system comprising a front profile (10) provided with a specific format that ensures greater ease in fixing and removing the tarp (40), such as to add a double sealing system and side profiles (20) having a specific shape, improving the sealing, operation and attachment system to the vehicle bed. The side profiles (20) also have a geometry that provides a system for fitting the tarp through a click, resulting in greater ease of use for the tarp and making the opening and closing operation very quick and practical. These profiles (20) also receive the C-clamps (70) that allow to fasten the tarp (40) structure to the bed.

12 Claims, 60 Drawing Sheets

(56) References Cited

U.S. PATENT DOCUMENTS

| | | | | |
|---|---|---|---|---|
| 6,669,264 B1* | 12/2003 | Tucker | ............... | B60J 7/104 |
| | | | | 296/100.15 |
| 8,475,096 B2 | 7/2013 | Spencer et al. | | |
| 8,632,114 B2* | 1/2014 | Yue | ............... | B60J 7/141 |
| | | | | 296/100.04 |
| 8,641,124 B1* | 2/2014 | Yue | ............... | B60J 7/141 |
| | | | | 296/100.09 |
| 8,714,622 B2* | 5/2014 | Spencer | ............... | B60P 7/02 |
| | | | | 296/100.18 |
| 9,120,413 B2* | 9/2015 | Fink | ............... | B60P 7/02 |
| 9,487,070 B2* | 11/2016 | Xu | ............... | B60J 7/10 |
| 10,144,276 B2 | 12/2018 | Facchinello et al. | | |
| 10,189,340 B2 | 1/2019 | Schmeichel et al. | | |
| 10,800,234 B2* | 10/2020 | Dylewski, II | ............... | B60J 7/198 |
| 11,014,436 B1* | 5/2021 | Zheng | ............... | B60J 7/198 |
| 11,148,512 B2* | 10/2021 | Shi | ............... | B60J 7/198 |
| 11,376,936 B2* | 7/2022 | Schollhammer | ............... | B60J 7/1607 |
| 11,485,206 B2* | 11/2022 | Cao | ............... | B60J 7/104 |

FOREIGN PATENT DOCUMENTS

| | | | | |
|---|---|---|---|---|
| BR | 202017024571 U2 | 6/2018 | | |
| BR | 102018074023 A2 | 2/2019 | | |
| BR | 102020010151 A2 * | 10/2020 | ............ | B60J 7/104 |
| EP | 3081417 A1 | 10/2016 | | |

* cited by examiner

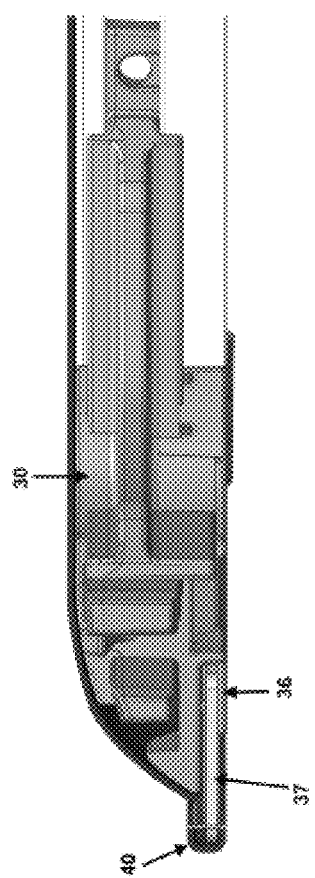

TONNEAU COVER FIXING AND ASSEMBLY SYSTEM

FIELD OF THE INVENTION

The present invention describes a tonneau cover fixing and assembly system. More specifically, it comprises a constructive assembly and fastening system applied to the front profile, side profiles and structural steel sections in order to facilitate and improve the practicality of the tonneau cover assembly system, its fabrication and implementation to the vehicle bed.

The front profile is provided with a specific format assuring greater ease in fixing and removing the tarp, in addition to embodying an exclusive sealing system. The side profiles, on the other hand, have a shape that improves the sealing and fixation system to the vehicle bed, in addition to a new tarp closing system. The front and side profiles are interconnected by structural steel sections provided with a specific shape, which guarantee a quick and no screws fitting system, which improves the assembly system and facilitates removal of the tarp, with no need to disassemble the entire assembly.

This new embodiment adds greater convenience to the installation and fixation of the tonneau cover, ensuring greater efficiency, durability, reliability and greater ease of use, enabling better movement, installation and fixation of the tarp to the vehicle bed. The side profiles also have a geometry that provides a click-through closing system of the tarp, resulting in great ease of use as it makes opening and closing very quick and practical.

BACKGROUND OF THE INVENTION

Light cargo vehicles similar to a pickup truck, with a sleeper-cab and open body (pickup trucks) are suitable for receiving the tonneau cover, which may or may not fall back, completely covering the vehicle bed.

The tonneau cover is made up of a set of profiles that generally form a rectangle, which will be attached to the vehicle bed in order to allow the tonneau to be fixed.

Currently, there is a wide variety of tonneaus to cover pickup trucks, closing the body and letting it stretch out, so that each model has a fastening and locking system that allows its closing and opening.

Initially, the tonneau models were equipped with a system of traction belts attached to the vehicle body that allowed the tarp to be kept taut, but these systems generated several inconveniences for users due to the delay in opening and closing, which resulted in a system with little practicality.

Current models describe fastening systems provided with a set of profiles arranged on the bed and fixed through fastening structures (C-clamps) that allow the arrangement and fastening of the tarp, but these systems have several inconveniences to users due to the difficulty in installing the profiles on the bed and by the restriction of the use of the tarp to the front profile, since after the installation of the profiles, the tarp is attached to the set, being necessary to remove all the profiles for removal, replacement or maintenance of the tarp, when necessary.

The front profile, when installed in the bed, keeps the tarp arranged to the vehicle cab, but the current embodiment of this front profile makes it impossible to have a perfect seal between the tonneau cover and cab, resulting in a higher incidence of water entrance inside the bed.

On the other hand, the embodiment and connection between the profiles and the structural steel sections make installation more difficult, as the structural steel sections are screwed or riveted to the profiles. Furthermore, these profiles have an embodiment that restricts the application of sealing systems.

Thus, the present inventor, seeking to solve the inconveniences of the market, has developed a new embodiment applied to the front profile, side profiles and structural steel sections that allow greater ease in installation and assembly, as it improves the alignment system of the tonneau cover on the bed, in addition to allow greater ease in the system for fixing and operating the tarp on the set.

In search performed in the prior art, we identified several documents that describe fastening and assembly systems applied to tonneau cover, which it can be highlighted the following documents:

U.S. Ser. No. 10/189,340 (Agri Cover. 2016) describes a folding tonneau cover apparatus including a cover assembly and a support frame assembly. The cover assembly having a plurality of rigid panels interconnected in series by a series of flexible hinges preferably made from a laminated woven fabric material. The cover assembly is secured to the support frame assembly to cover a cargo box of a pickup truck by a plurality of locking members when the support frame assembly is secured to the sidewalls of the cargo box.

U.S. Ser. No. 10/144,276 (Extang. 2014) describes a tonneau cover system clamp that includes first and second clamp members with first and second clamp surfaces, respectively. A locking mechanism can be movable to engage the elongate member to prevent lateral translation of the second clamping surface relative to the first clamping surface in response to the first and second clamp members being in the locked position.

EP3081417 (Bestop. 2015) describes a tonneau cover assembly connected to a cable tensioning system that eliminates the need for side rails to both locate and tension the top cover. The rear attachment assembly holds the top cover in a closed tensioned state until the cover is opened by an operator. The tonneau cover assembly reduces weight and complexity, while eliminating the need for side rails.

U.S. Pat. No. 8,475,096 (Truxedo. 2008) describes a tonneau cover cargo containment track rail system including a cargo hold down and at least one tonneau cover rail. The tonneau cover rail has a first attachment mechanism attached thereto.

These documents mentioned in the prior art describe constructive systems applied to tonneau covers provided with its own embodiment, but no prior art document describes an embodiment that facilitates the installation and alignment system of the set and having profiles provided with an embodiment which facilitates the attachment and movement of the tarp.

MU8103687-6 (2011), BR202017024571-9 (2017) and BR102018074023-7 (2018), by the same owner, describe embodiments applied to the tonneau covers, and the new embodiment claimed in the present application describes an improvement in the fixation and installation system of the side and front profiles to the vehicle bed in order to improve the fixation and movement of the tarp.

BR1020200101510, by the same owner, describes and claims in detail the embodiment form of the opening and locking tonneau cover system, and in the present specification the embodiment is again referenced and briefly detailed using the claimed and published subject material as a basis at an earlier time.

Thus, the object of the present invention is a tonneau cover fixing and assembly system comprising a front profile provided with a specific shape that ensures greater ease in fixing and removing the tarp, so that it adds a double sealing system and side profiles having a specific shape, improving the sealing, operation and attachment system to the vehicle bed. The side profiles also have a geometry that provides a click-through tarp fitting system, resulting in greater ease of use for the tarp and making the opening and closing operation very quick and practical. These profiles also receive the C-clamps that allow you to attach the tarp structure to the bed. These C-clamps can be tightened from above or below, facilitating the attachment of the product to the vehicle and reducing installation time. The front and side profiles are interconnected by structural steel sections provided with a specific format, which add a quick-fit system, without screws, which improves the installation system and facilitates removal of the tarp, with no need to uninstall the entire set. This new embodiment adds greater manufacturing and installation practicality, ensuring greater efficiency, durability, reliability and enabling better use by the user.

SUMMARY OF THE INVENTION

Due to the drawbacks identified in the prior art, the object of the present invention is a tonneau cover fixing and assembly system provided with the following characteristics:

The present invention features a tonneau cover fixing and assembly system that provides a front profile with a bas-relief having a groove that allows the sliding fit of the plastic front profile fixed to the tarp.

The present invention features a tonneau cover fixing and assembly system that provides a front profile with a lower projection provided with a groove for sliding fit of the front seal rubber.

The present invention features a tonneau cover fixing and assembly system that provides a front profile provided with a bas-relief for fit-fastening the sealing rubber between the tonneau cover and the bed.

The present invention features a tonneau cover fixing and assembly system that provides a front profile equipped with a bas-relief provided with flaps that allow the fixation of structures equipped with elastics for fixing the tarp when rolled.

The present invention features a tonneau cover fixing and assembly system that provides a front profile with holes that allow the fitting of structural steel sections through a click.

The present invention features a tonneau cover fixing and assembly system that provides a structure that is provided with a tab that allows the sliding fit of the tarp to the bas-relief of the profile, which has a pair of flaps for fixing the elastic cord set to its central portion.

The present invention features a tonneau cover fixing and assembly system that provides side profiles equipped with a bas-relief having a groove for fit-fastening the plastic lateral profile of the tarp.

The present invention features a tonneau cover fixing and assembly system that provides side profiles provided with a bas-relief for fit-fastening the lower seal.

The present invention features a tonneau cover fixing and assembly system that provides side profiles equipped with a groove that allows the fitting of structures for fixing the tonneau cover to the vehicle bed, as well as holes at the ends of the profile that allow structural steel sections and terminals to be clicked.

The present invention features a tonneau cover fixing and assembly system that provides a C-clamp structure that is provided with a first piece that fits with the second piece and that have housings for positioning the nut to be screwed from above or below.

The present invention features a tonneau cover fixing and assembly system that provides structural steel sections, connecting the front profile and the side profiles, having tab that work as snap guides and locking rod through a click.

The present invention features a tonneau cover fixing and assembly system that provides a tarp equipped on its front face with a plastic profile and on its side faces with a plastic profile, the profiles fixing to the tarp occurring by hemming, said tarp further receiving the arrangement of the support crossbars.

The present invention features a tonneau cover fixing and assembly system that provides a rear profile equipped with structural steel sections of specific format that allow the connection of the tarp assembly to the structure of the rear profile assembly through the rear profile tips.

The present invention features a tonneau cover fixing and assembly system that provides a rear profile equipped with tips connected to the side profiles and actuators that are positioned in pairs in the central portion of the profile.

BRIEF DESCRIPTION OF THE FIGURES

FIGS. 25, 25A, 25B and 25C show views of the tarp lower clamping and locking structure along with the structural steel section.

DESCRIPTION OF THE INVENTION

Figure 1:
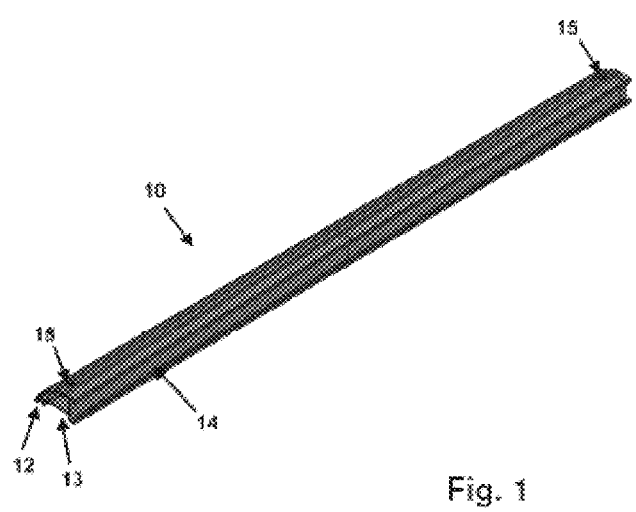
FIG. 1 shows the rear perspective view of the front profile.
Figure 2:
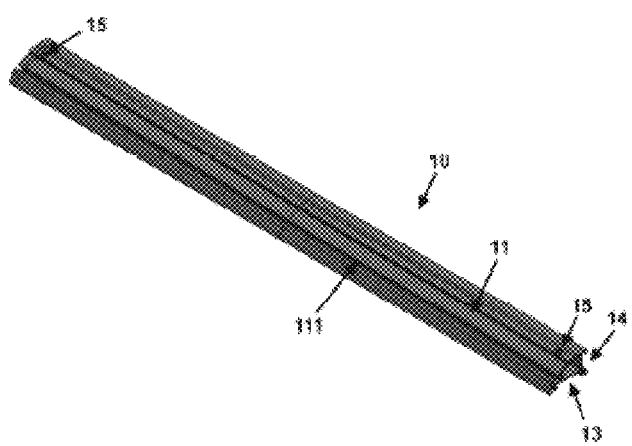
FIG. 2 shows a perspective view of the front profile.
Figure 3:
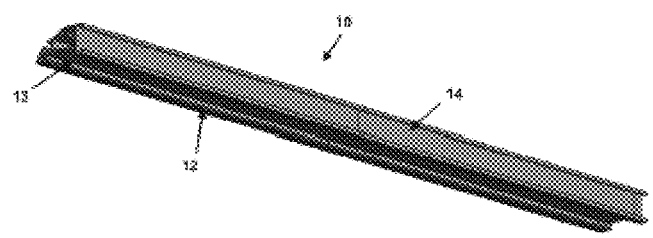
FIG. 3 shows the bottom perspective view of the front profile.
Figure 4:
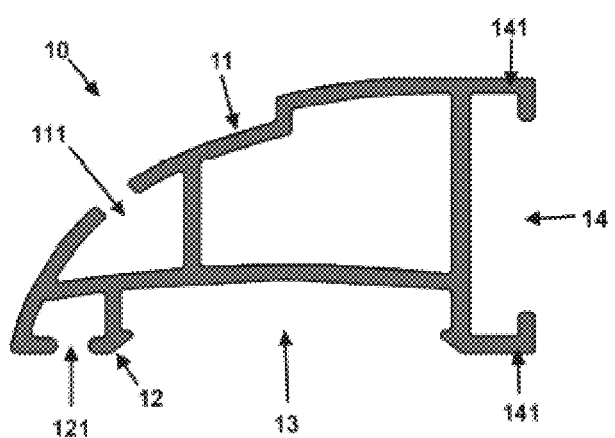
FIG. 4 shows the side view of the front profile.
Figure 5:
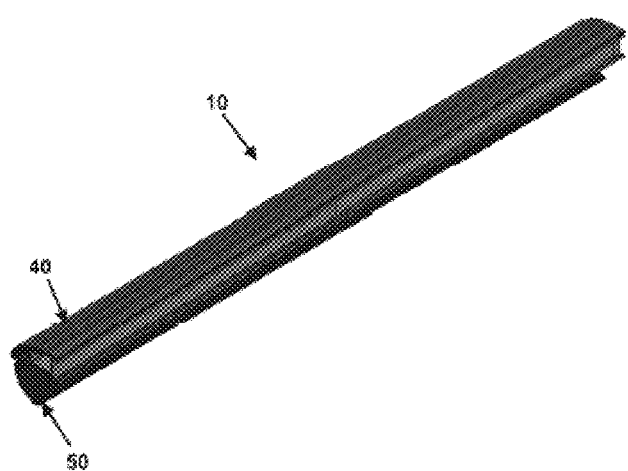
FIG. 5 shows a perspective view of the front profile, detailing the sealing profiles, tarp and attachment points.
Figure 6:
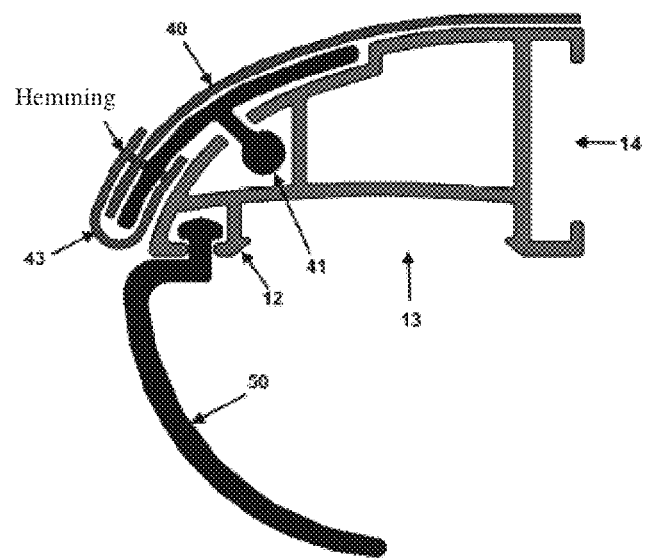
FIG. 6 shows the side view of the front profile, detailing the sealing profiles, tarp and attachment points.
Figure 7:
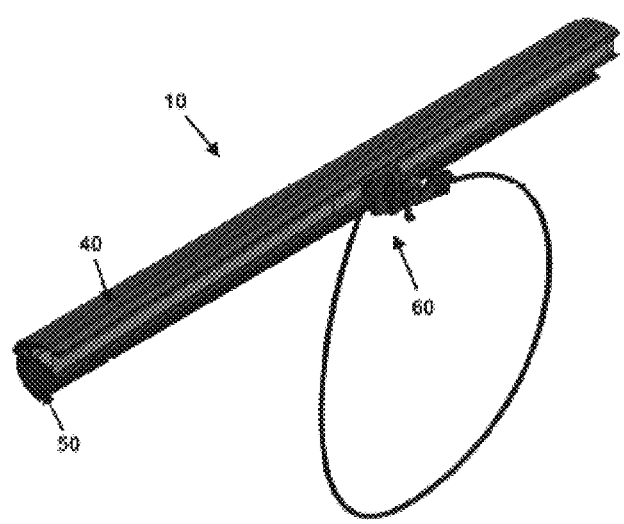
FIG. 7 shows a perspective view of the front profile, detailing the structure for fixing the tarp with elastic cord.
Figure 8:
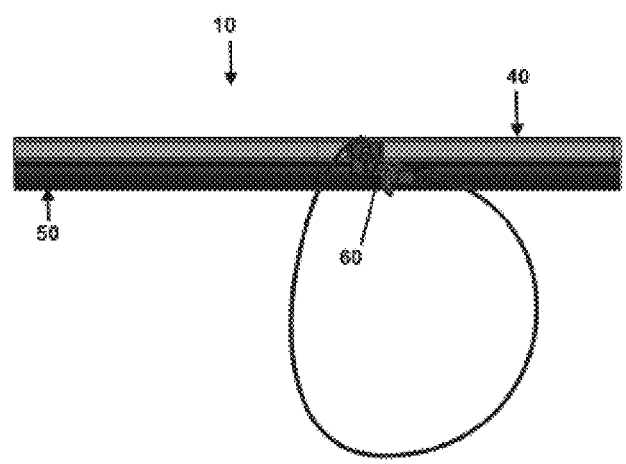
FIG. 8 shows the rear view of the front profile, detailing the structure for fixing the tarp with elastic cord.
Figure 9:
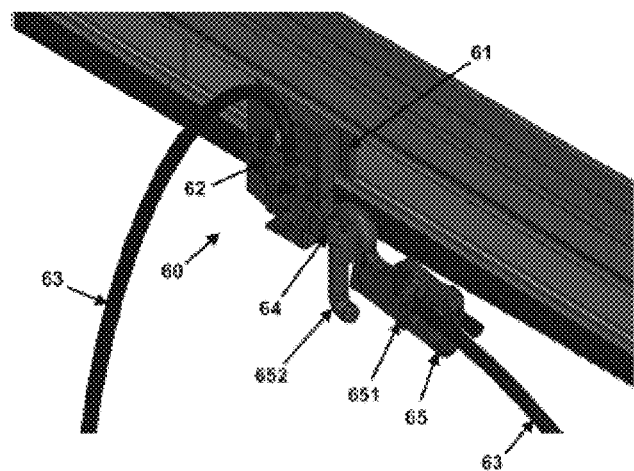
FIGS. 9, 9A and 9B show the details of the tarp fixation structure, demonstrating its embodiment.
Figure 9A:
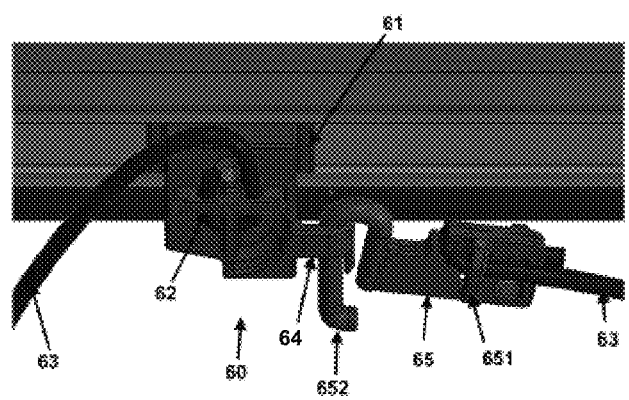
Figure 9B:
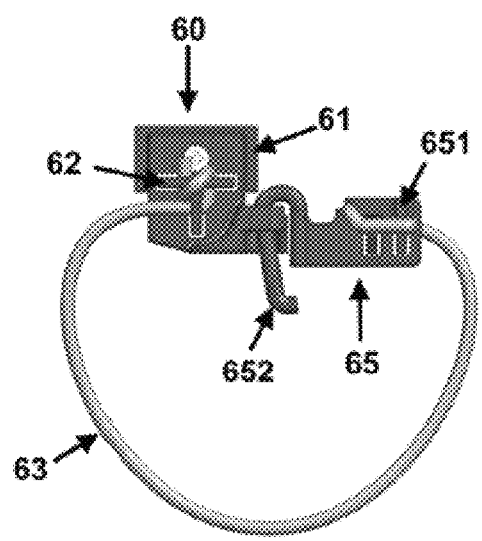
Figure 10:
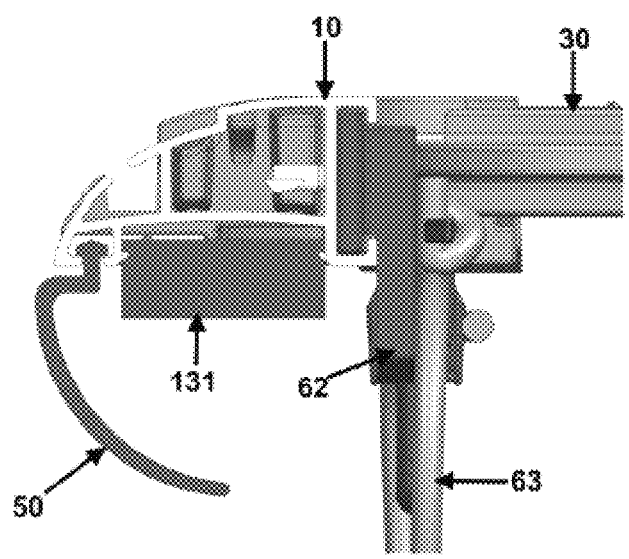
FIGS. 10 and 10A show the view of the front profile provided by the sealing rubber and the tarp fixation structure by elastic cord.
Figure 10A:
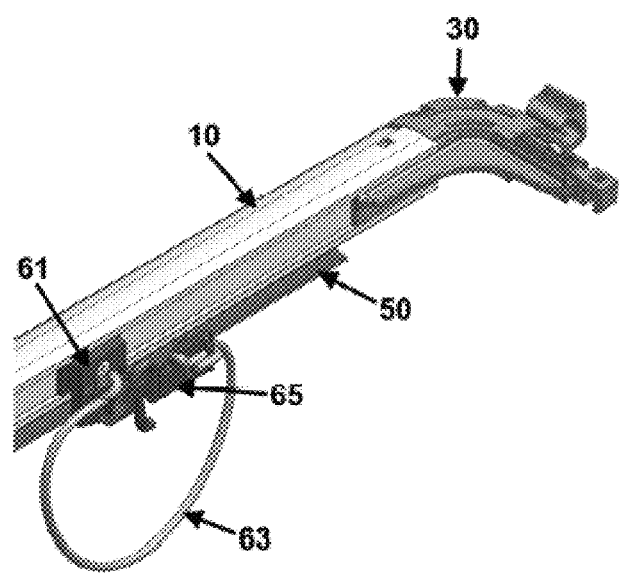

The tonneau cover fixing and assembly system, object of the present invention, comprises a front profile (10) and side profiles (20) interconnected by structural steel sections (30) in order to allow the fixation and arrangement of the tarp (40).

The front profile (10) is provided with a bas-relief (11) having a groove (111) that allows the sliding fit of the plastic front profile (41) fixed to the tarp (40) and a lower tab (12) provided with a groove (121) that allows the fastening by sliding fit of the front seal rubber (50).

In the lower portion of the profile (10), a bas-relief (13) is arranged, which allows the fastening by fitting of the sealing rubber (131) ensuring the sealing between the tonneau cover and the bed. On the rear portion of the profile (10), a bas-relief (14) is arranged, provided with flaps (141) that allow the fixation of the structures (60) provided with elastic cords for fixing the tarp (40) when rolled up.

Figure 21:
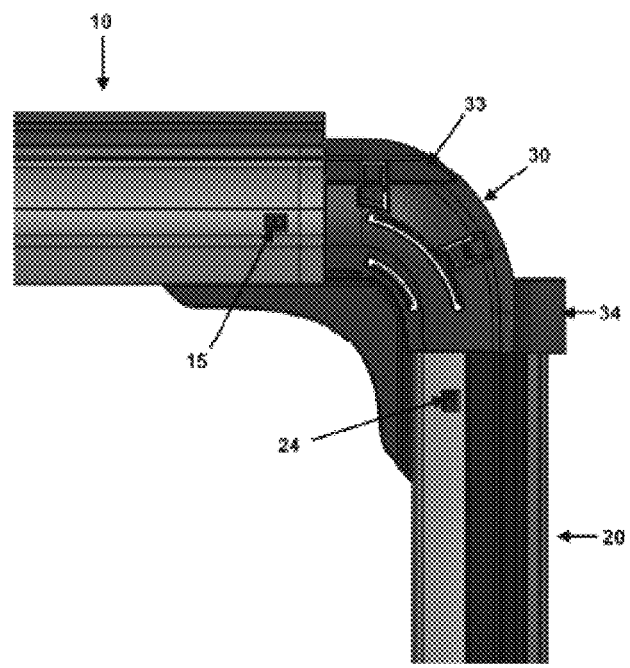
FIG. 21 shows the top view of the structural steel section attached to the front profile and side profile, detailing the attachment means.

At the ends of the profile (10), next to the upper portion, holes (15) are arranged that allow the fitting of structural steel sections (30) through a click, as detailed in FIG. 21.

The structure (60) is provided with a tab (61) that allows the sliding fit along the bas-relief (14) of the profile (10) in order to allow greater variability in the positioning of the structure to the profile. The structure (60) has a pair of flaps (62) that allow the fixation of an elastic cord (63) in its central portion with no need for additional fasteners, so that the flaps (62) allow easier positioning, fixation and elastic cord adjustment as detailed in FIGS. 7, 8, 9 and 9A.

The structure (60) is provided with a side flap (64) that allows the attachment of the structure (65) fixed to the opposite end of the elastic cord (63), said structure (65) having a pair of flaps (651) that allow the elastic cord fixation and a tab (652) that allows positioning along the side flap (64), as shown in FIGS. 9, 9A, 9B, 10 and 10A.

Figure 11:
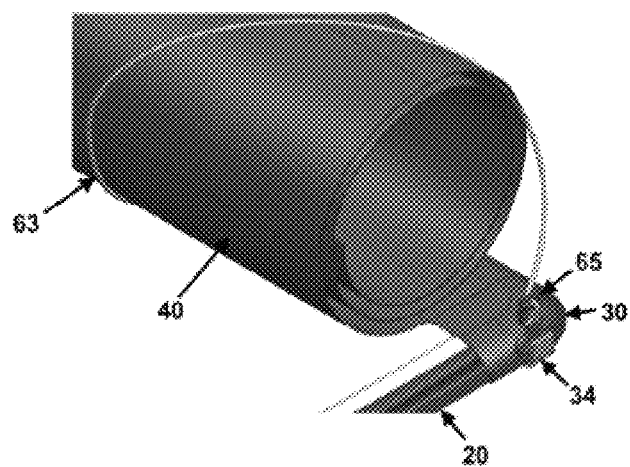
FIGS. 11, 11A and 11B show the tarp wrapped around the front profile and showing the elastic cord attached to the structural steel section.
Figure 11A:
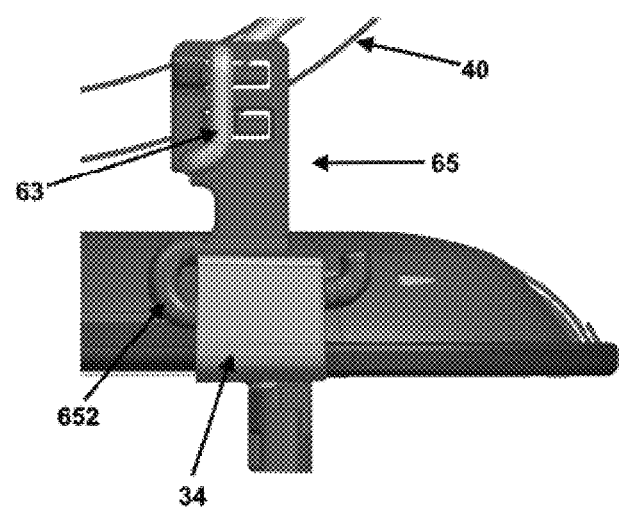
Figure 11B:
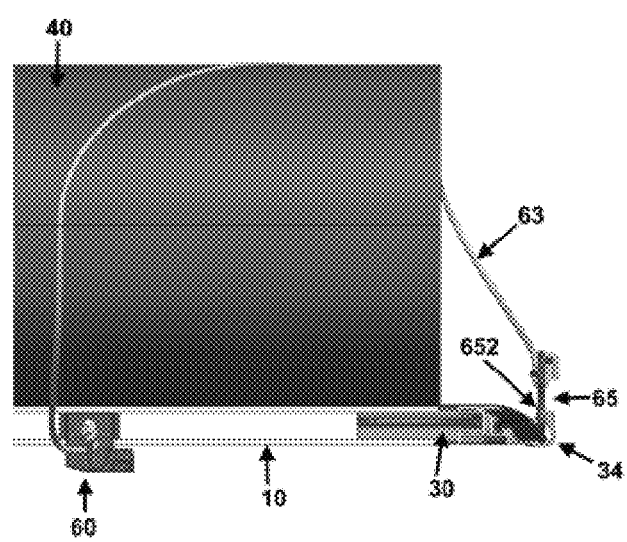
Figure 12:
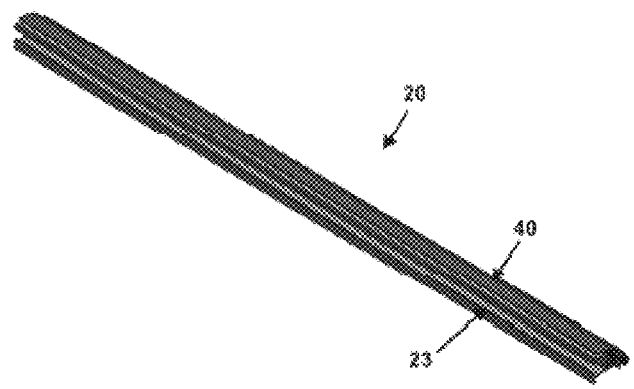
FIG. 12 shows the perspective view of the side profile.
Figure 13:
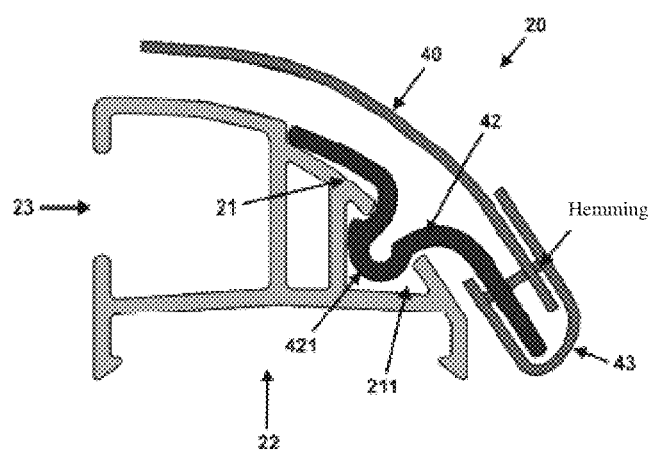
FIG. 13 shows the side view of the side profile.

The structure (60) fixes the tarp (40) holding it when rolled up, fitting the tab (652) of the structure (60) into the tab (34) of the structure (30), as shown in FIGS. 11, 11A and 11B.

The side profiles (20) are provided with a bas-relief (21) having a groove (211) that allows the fixation of the lateral plastic profile (42) of the tarp (40), said profile (42) having a tab (421) that allows the pressure-fitting with the groove (211), facilitating the opening and closing of the tarp, as detailed in FIGS. 12-15.

Figure 15:
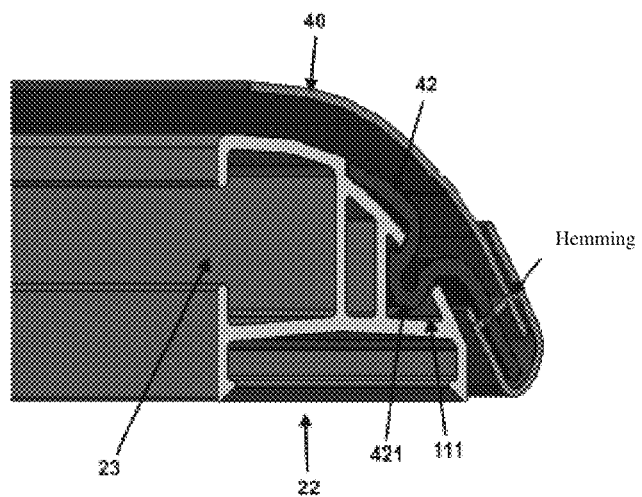
Figure 15A:
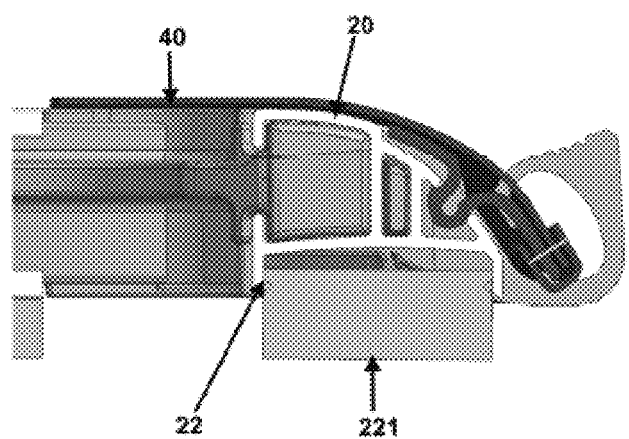

In the lower portion of the profile (20) there is a bas-relief (22) that allows the fastening by fitting of the sealing rubber (221) that provides the sealing between the profile (20) and the vehicle bed (not shown), as shown in FIG. 15A.

Figure 16:
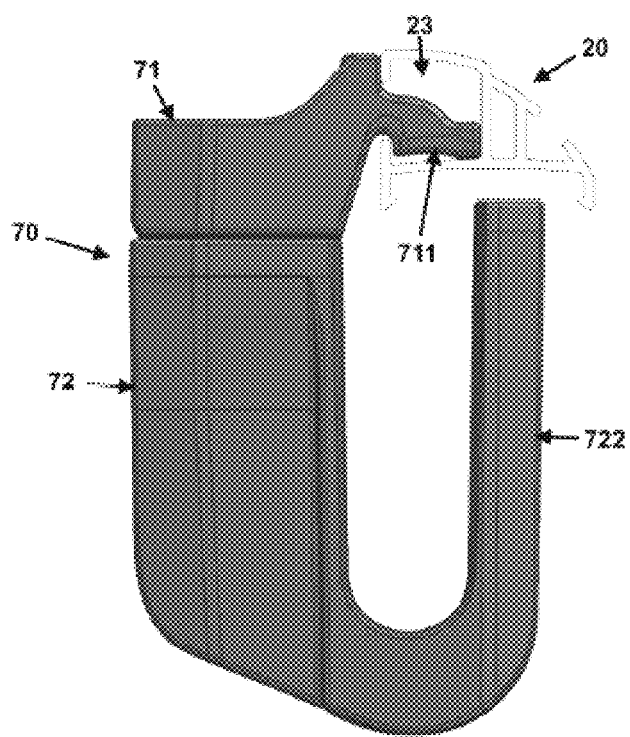
FIG. 16 shows the side view of the side profile fixing structure with the vehicle bed called fixing C-clamp.

On the rear portion of the profile (20) a groove (23) is arranged allowing the fixation of the structures (70), called fixation C-clamps, which serve to fix the tonneau cover to the vehicle bed, as shown in FIG. 16.

Figure 14:
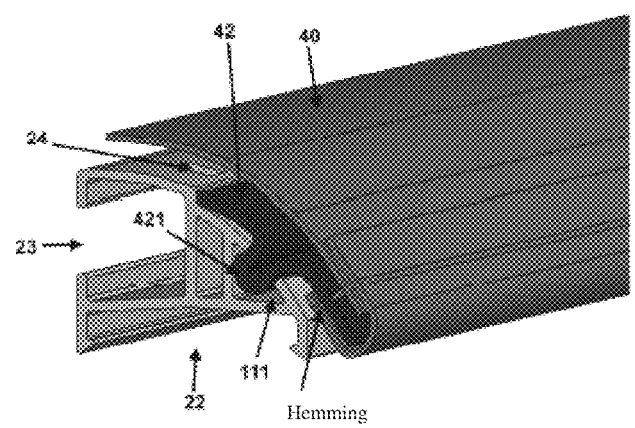
FIGS. 14, 15, 15A show perspective views of the detailing of the fixing of the tarp provided by the plastic profile with the profile.

At the ends of the profile (20), with the upper portion, holes (24) are arranged allowing the fitting of the structural steel sections (30) through a click, as detailed in FIG. 14.

The side profiles (20) allow the fastening of the locking structures (70) of the tonneau cover with the groove (23) in a sliding way, ensuring variability in the positioning of the structure, as detailed in FIG. 16.

Figure 17:
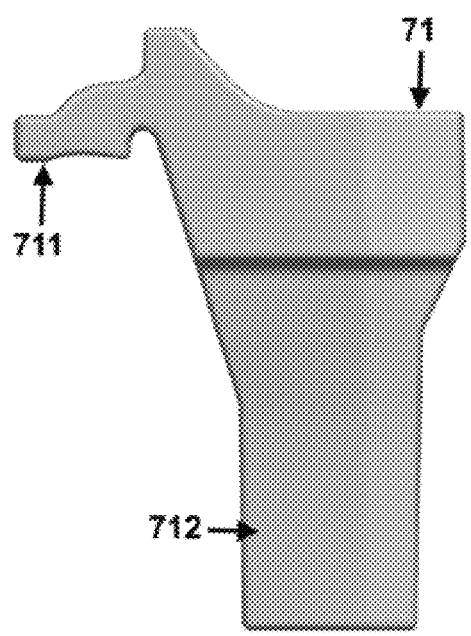
FIGS. 17 and 17A show the first piece of the fixing structure, detailing its embodiment.
Figure 17A:
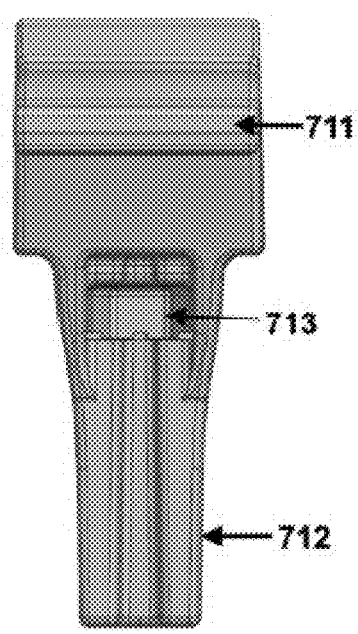
Figure 20:
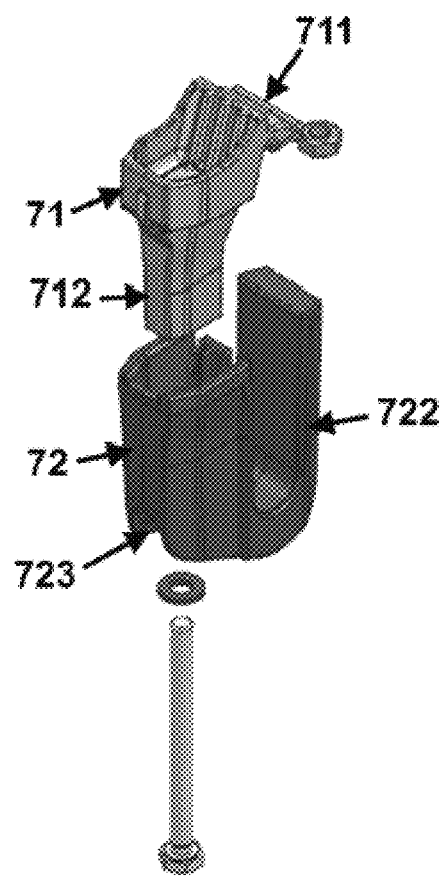
FIGS. 20, 20A, 20B, 20C and 20D of the side profile fixing structure with the vehicle bed, detailing the way of fixing from above.
Figure 20A:
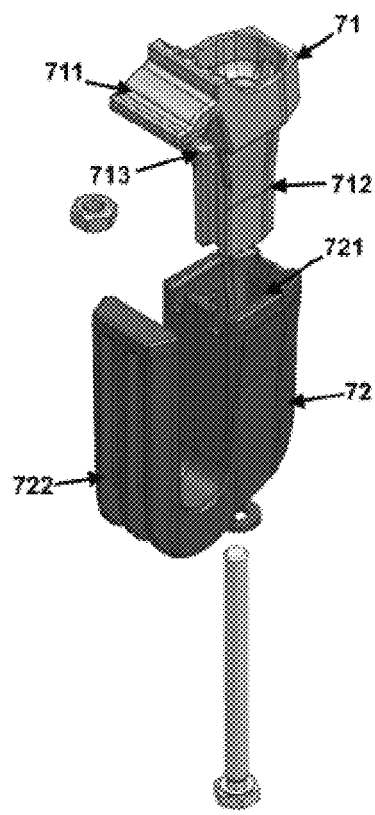
Figure 20B:
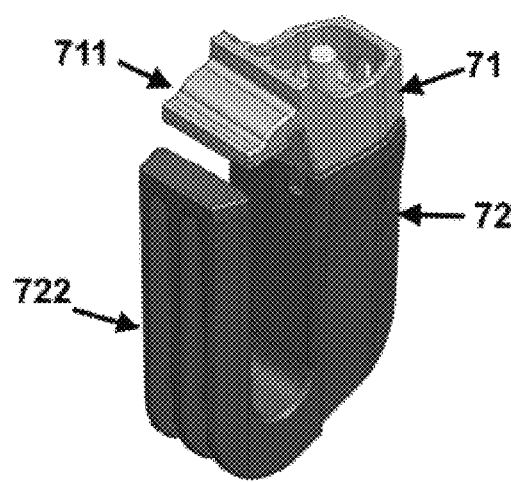
Figure 20C:
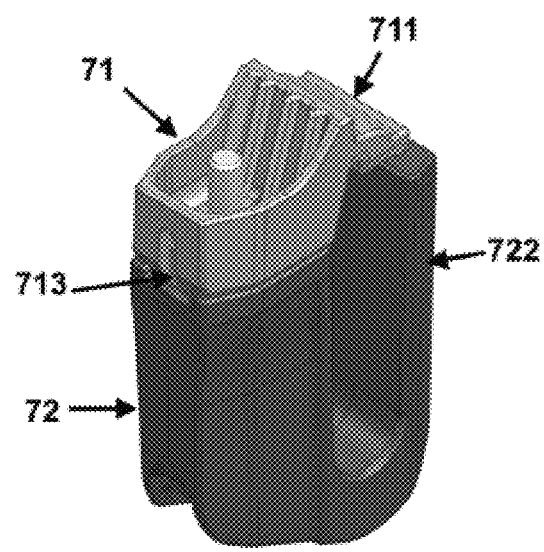
Figure 20D:
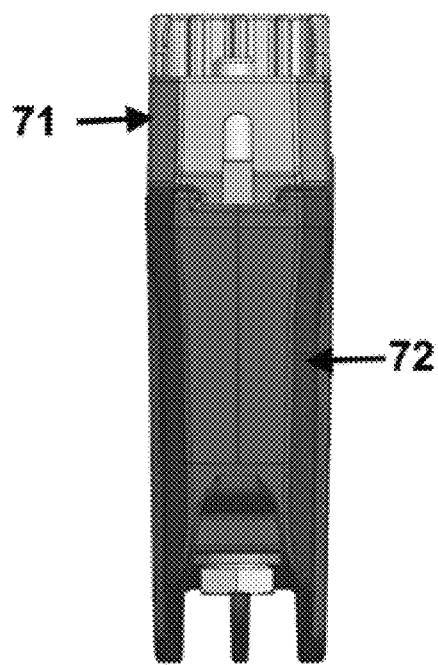

The structure (70) is provided with a first piece (71) having a flap (711) that fits with the groove (23) and a tab (712) that fits with the second piece (72), said tab (712) having a housing (713) for nut positioning when the structure (70) is bolted from below, as shown in FIGS. 17, 17A and FIG. 20.

Figure 18:
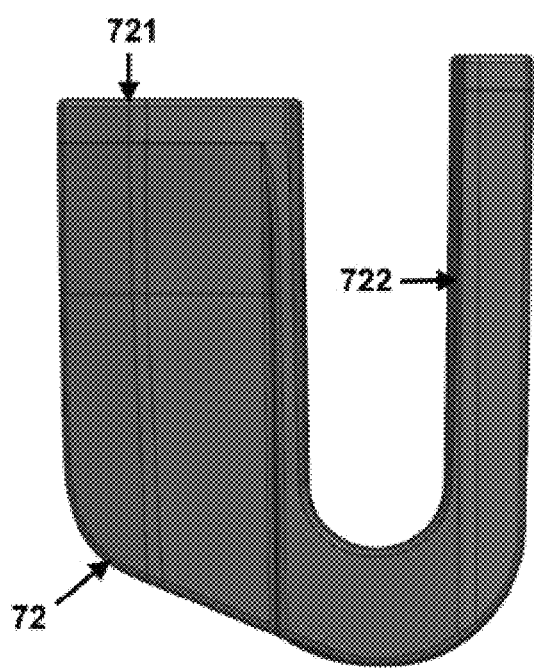
FIGS. 18 and 18A show the second part of the fixing structure, detailing its embodiment.
Figure 18A:
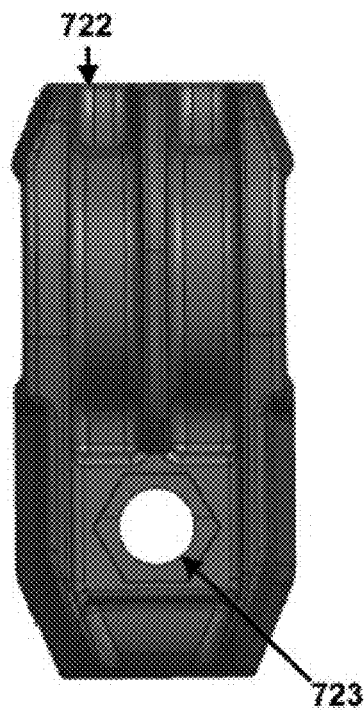
Figure 19:
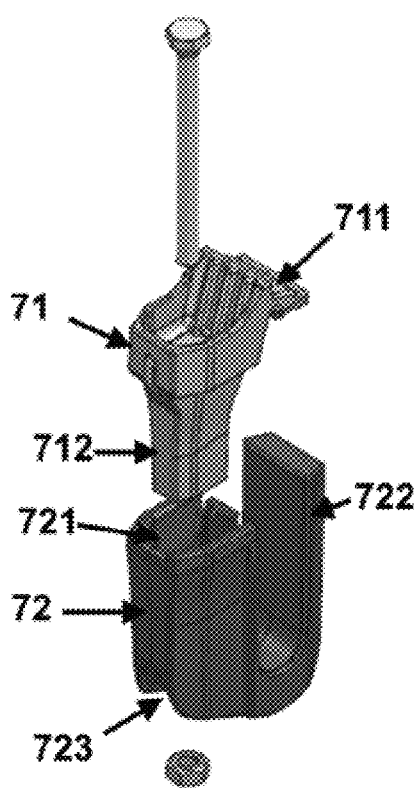
FIGS. 19, 19A, 19B, 19C and 19D of the lateral profile fixing structure with the vehicle bed, detailing the way of fixing from above.
Figure 19A:
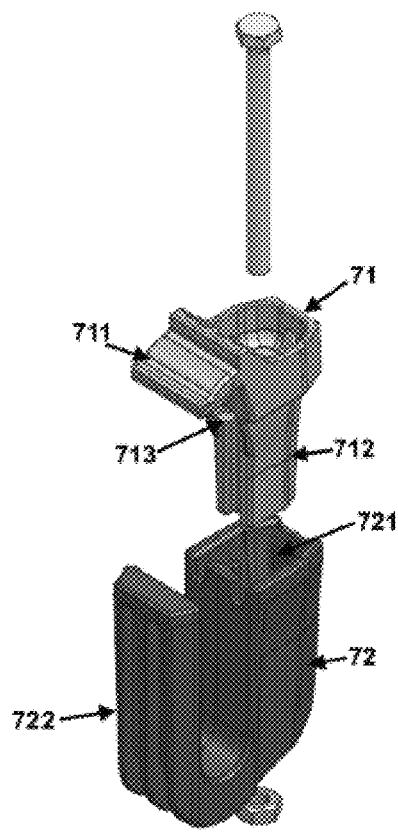
Figure 19B:
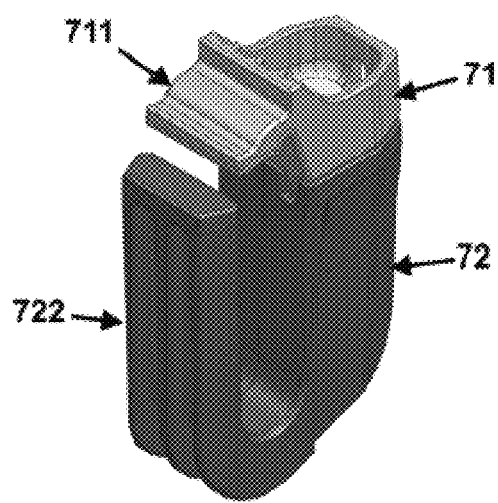
Figure 19C:
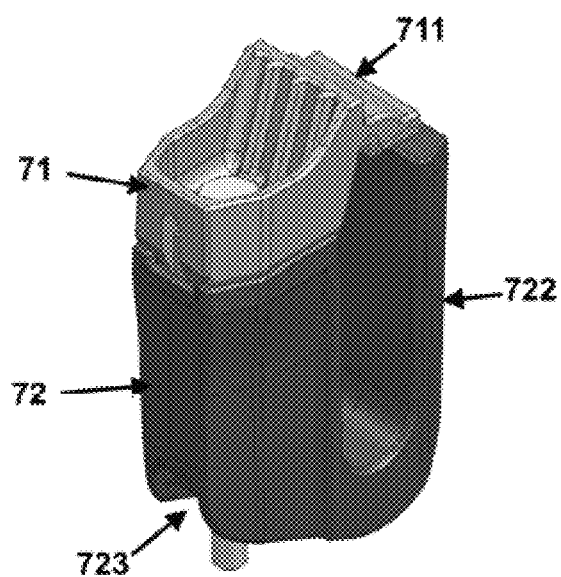
Figure 19D:
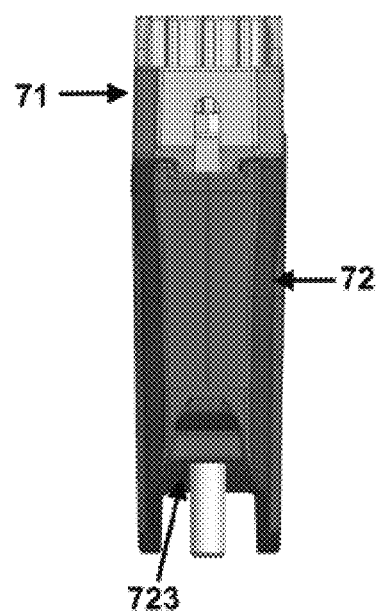

The second part (72) having a spacing (721) for fitting the tab (712) and a flap (722) that allows locking with the vehicle bed, said flap (722) having a housing (723) in the lower portion for nut positioning when the structure (70) is screwed from above, as shown in FIGS. 18, 18A and FIG. 19.

The parts (71) and (72) are provided with an upper hole (73) allowing the fixing and junction between the parts through screw and nut above or below.

In the case of tightening from above, the nut is placed in the housing (723) located on the underside of the part (72). In the case of tightening from below, the nut is placed inside the housing (713) located on the front of the part (71). Thus, at the time of assembly, it is possible to position the tonneau cover in the bed with it closed and place the C-clamps on the back of the bed, pressing from below, so that the tonneau cover is already pre-positioned. Afterwards, the tonneau cover is opened to place the other C-clamps, pressing it from above.

FIGS. 19, 19A, 19B, 19C and 19D show the perspective views of the parts (71) and (72) fixed with screw and nut with tightening from above.

FIGS. 20, 20A, 20B, 20C and 20D show the perspective views of the parts (71) and (72) fixed with screw and nut with tightening from below.

Figure 22:
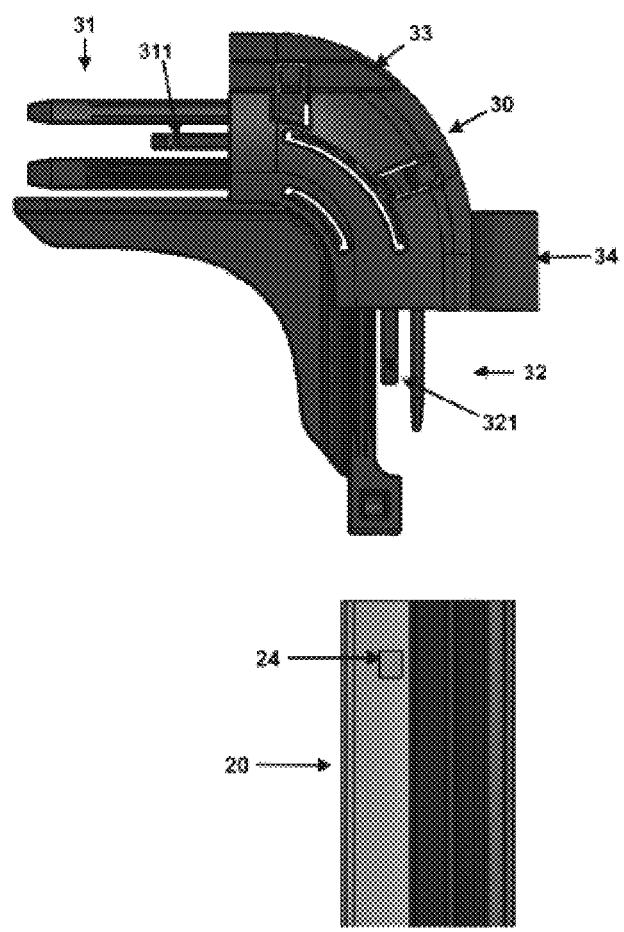
FIGS. 22 and 23 show the top view of the structural steel section along the side profile, detailing the click attachment means.
Figure 23:
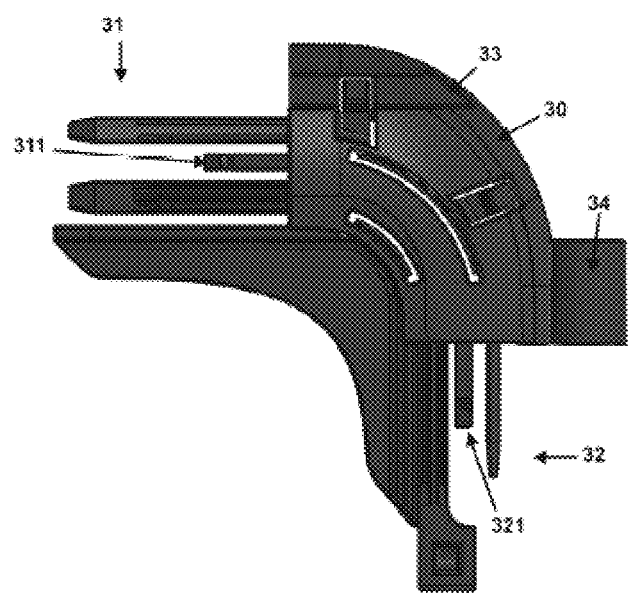
Figure 24:
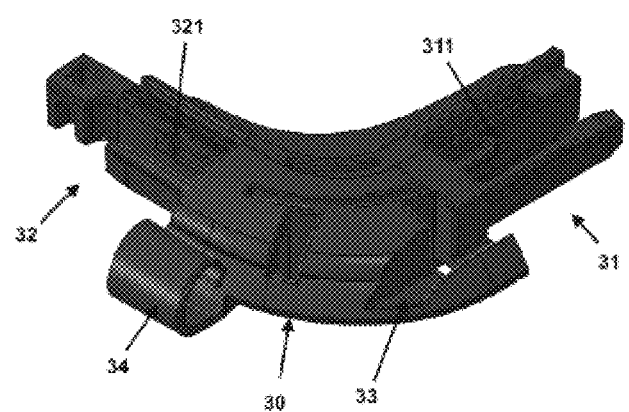
FIG. 24 shows the perspective view of the structural steel section.
Figure 25:
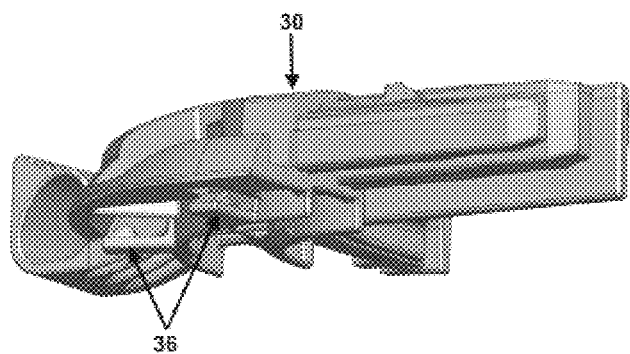
Figure 25A:
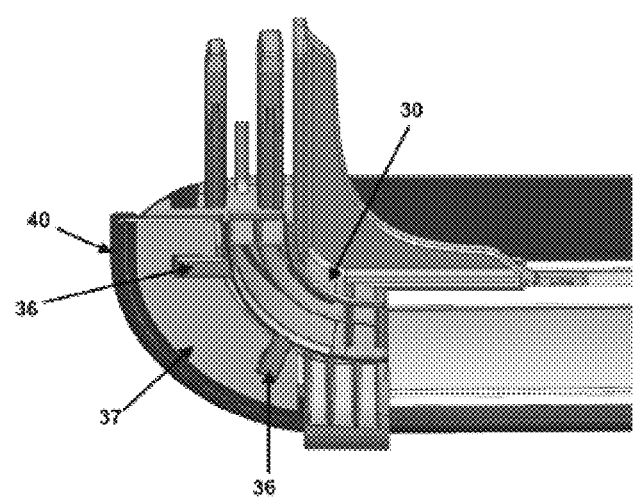
Figure 25C:
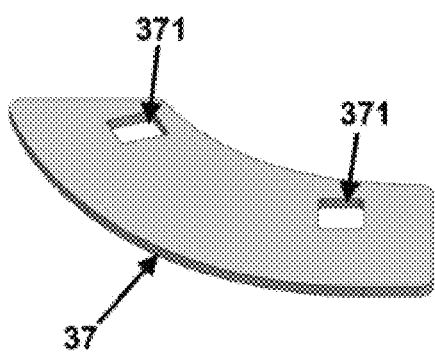
Figure 26:
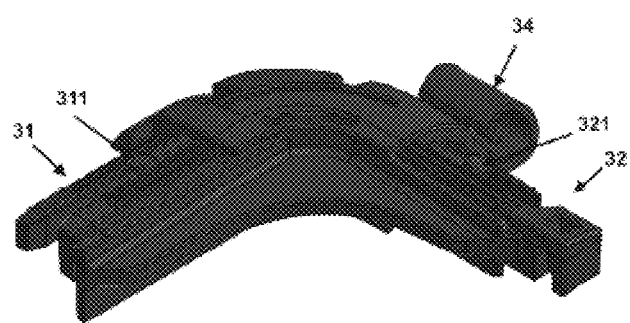
FIG. 26 shows the perspective view of the structural steel section, detailing its embodiment.
Figure 27:
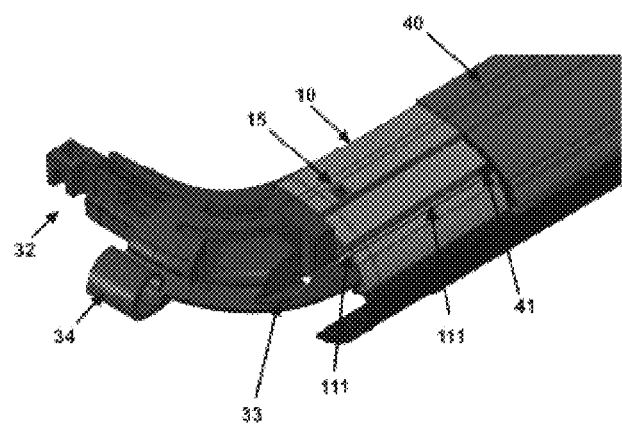
FIGS. 27 and 28 show the detailed movement of the tarp along the front profile and groove of the structural steel section, demonstrating that the tarp can be slidably removed.
Figure 28:
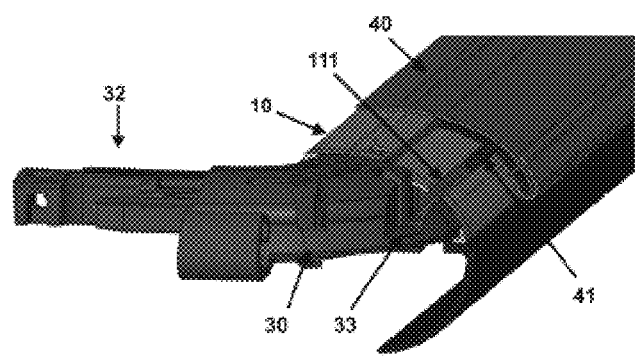

The structural steel section (30), connecting the front profile (10) and the side profiles (20), has a tab (31) that works as a snap-in guide and locking rod (311) equipped with a tooth that snaps together the hole (24) of the side profile (20) through a click. And tab (32) that describes locking rod (321) provided with guides and tooth that fits together with the hole (15) of the front profile (10) through a click. Said projections (31) and (32) that facilitate the fastening and fitting system between the structures in a quick and easy way, with no need to use a screw, as detailed in FIGS. 21 and 22.

The structural steel section (30) has, with the fixation portion of the front profile (10), a relief (33) aligning with the groove (111) in order to allow the sliding movement of the tarp (40) profile (41), allowing the removal of the tarp (40), when rolled up, with no need to disassemble the entire set.

The structural steel section (30) has with the fixing portion of the side profile (20), a projected flap (34) that makes it possible to fit and fix the tarp (40), in order to avoid disengagement when opening or closing, reducing thus the tension point.

In the lower portion of the structural steel section (30) are arranged fittings (36) for positioning the piece (37) for locking the tarp (40), said piece (37) provided with holes (371) allowing fixing and positioning of the fittings (36) as shown in FIGS. 25, 25A, 25B and 25C.

Figure 29:
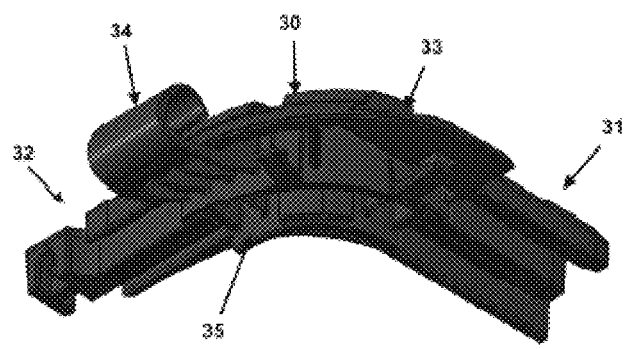
FIG. 29 shows the bottom perspective view of the structural steel section, detailing its embodiment.

In the lower portion of the structural steel section (30) a bas-relief (35) is arranged allowing the fixing and fitting of the sealing rubber (not shown) that is pressed onto the vehicle bed, ensuring the sealing of the assembly, as detailed in the FIG. 29.

Figure 30:
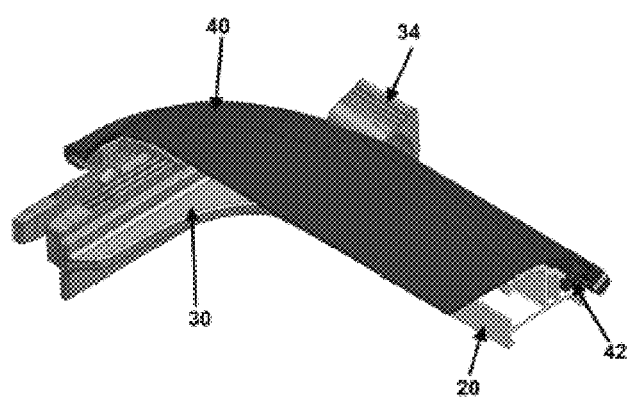
FIGS. 30, 30A and 30B show views of the fixed tarp fitted together with the structural steel section, detailing the way of fixing and locking.
Figure 30A:
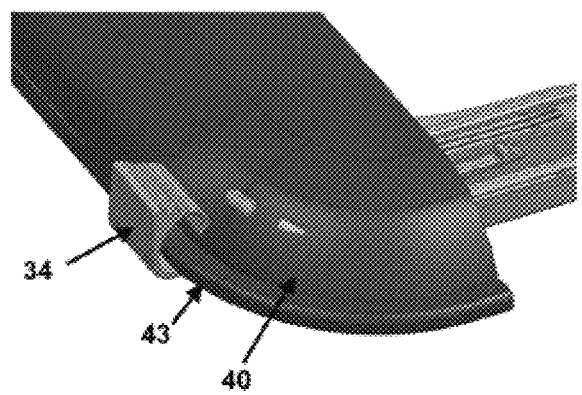
Figure 30B:
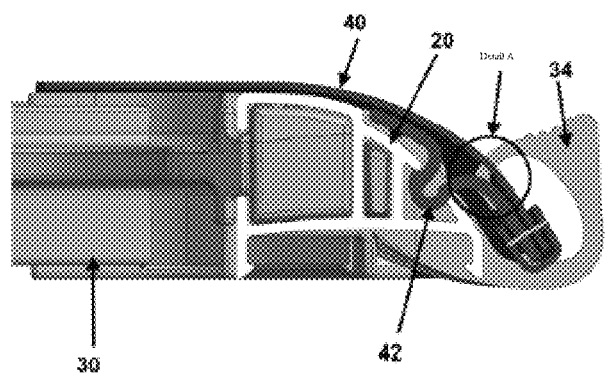

The tarp (40) is provided on its front face with a plastic profile (41) and on its side faces with a plastic profile (42), and the fixing of the profiles (41) and (42) to the tarp (40) occurs by hemming arranged on the edge of the tarp with the profiles, ensuring a better finish, greater resistance to sewing and preventing the tarp mesh from unraveling, as detailed in FIGS. 30, 30A and 30B.

In FIG. 30B a 'detail A' is shown which demonstrates the fitting (34) in the tarp (40) by interference, thus securing the tarp to the tonneau cover structure.

Figure 31:
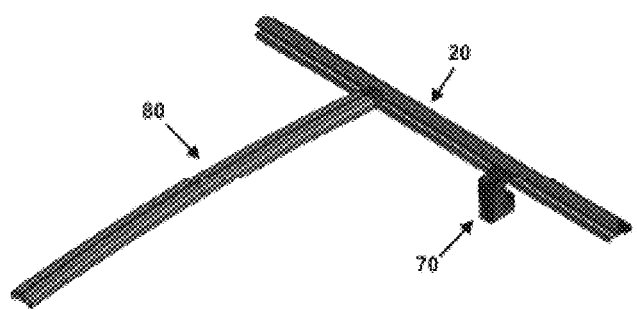
FIGS. 31, 32 and 33 show the perspective and side views of the crossbar positioning along the side profile, detailing the way of fixing and sewing with the tarp.
Figure 32:
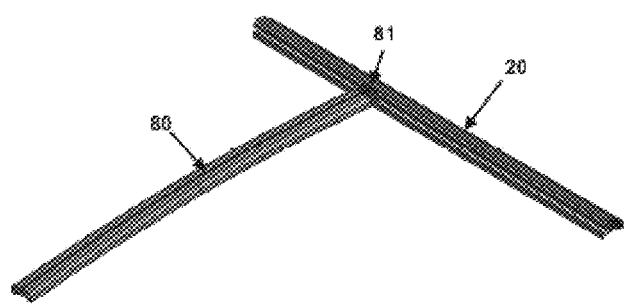
Figure 33:
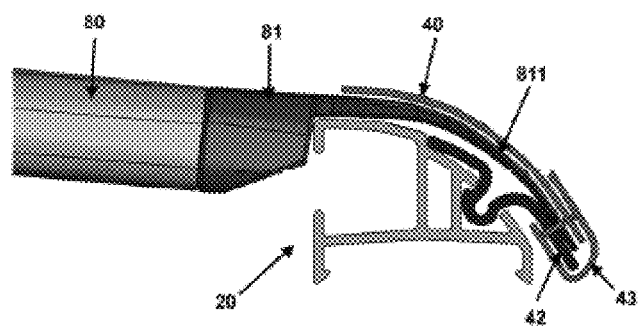

The tarp (40) also receives the provision of crossbars (80) to support the tarp, said crossbars (80) provided with tips (81) sewn between the side face of the tarp (40) and the profile (42). Thus, when the tarp is rolled up or unrolled, the support crossbars (80) follow the movement, facilitating the opening and closing of the tonneau cover. The tips (81) have a flap (811) following the shape of the side profiles (20) so that the end of the flap (811) is sewn with the tarp (40) by hemming (43), as shown in the FIGS. 31, 32 and 33.

Figure 34:
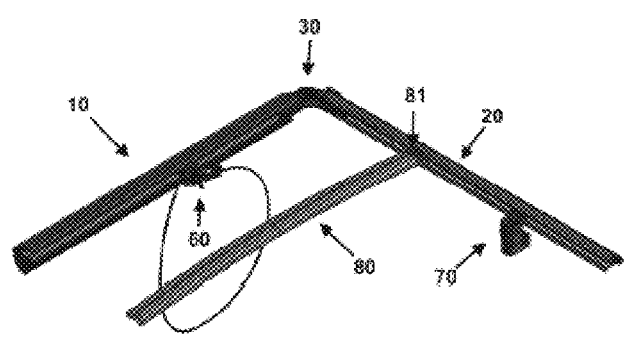
FIGS. 34, 35 and 36 show the perspective and top views of the front profile, side profile and structural steel section, detailing the positioning of the other components.
Figure 35:
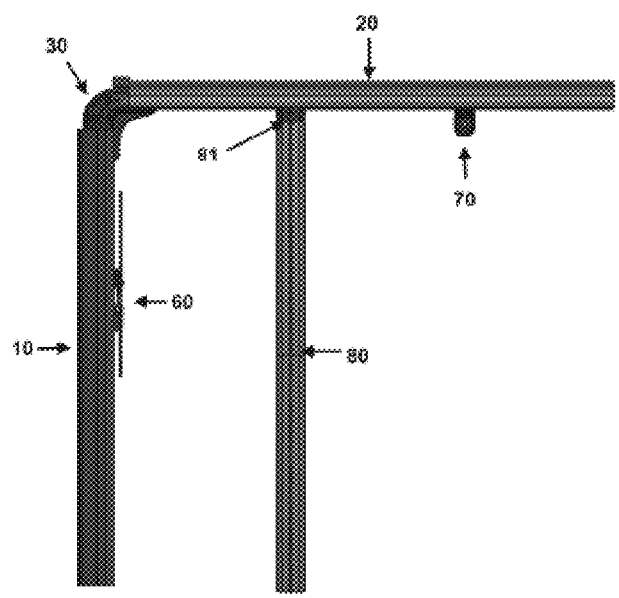
Figure 36:
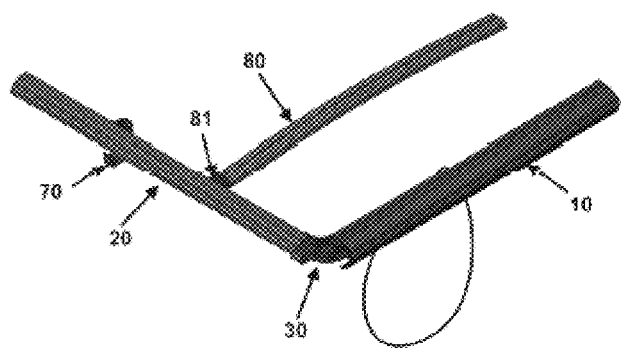

FIGS. 34, 35 and 36 demonstrate the positioning of the front profile (10) provided with the structure (60) and the side profile (20) provided with the fixing structure (70) and crossbar (80), said profiles are connected through the structural steel section (30), thus representing the positioning of the main components of the tonneau cover fixing and assembly system.

Figure 37:
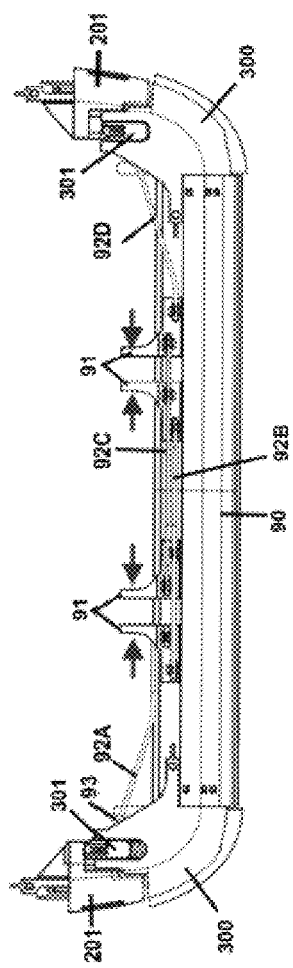
FIG. 37 shows the top view of the rear profile, detailing the opening and closing actuation multi-lock system.

The rear profile (90) is arranged at the rear portion of the tonneau cover equipped with a multi-lock system that ensures easier opening and closing of the tonneau cover, as shown in FIG. 37. The rear profile (90) is equipped with structural steel sections (300) of specific shape that allow the connection with the tips (201) of the side profiles (20), said structural steel sections (300) being provided with a locking structure (301).

The actuation system between the structures (300) connected to the profile (90) and the tips (201) connected to the side profiles (20) occurs through the actuation of the actuators (91) by the user, so that with the fingers, thumb and the index, under the profile (90), will activate it by moving the two pieces together (91).

The actuators (91) are positioned in pairs in the central portion of the profile (90), so that the total release of the system can occur by actuation by any pair of actuators (91). This actuation system is only possible due to the interconnection way between the actuators (91), set of rods (92) and pins (93).

The actuators (91) are modular, allowing them to be applied and adapted according to the need for using the tonneau cover model, allowing for greater variability in the system's implementation. In addition, the actuators (91) can be positioned one at each end and can be activated by both hands in the case of a low-cost version.

The actuator system (91), as shown in the images, will have four rods (92A), (92B), (92C) and (92D) with two connected to the pins (93) and the other two connected between the actuators (91) which allows the transmission of motion.

The actuation system by actuators (91) and rods has a modular feature, as it allows the use of one (1) or more pairs of actuators (91) in the same profile (90), according to the application need and tonneau cover type being used, allowing to vary the opening shape with one or two hands depending on the distance between the pieces (91).

Figure 38:
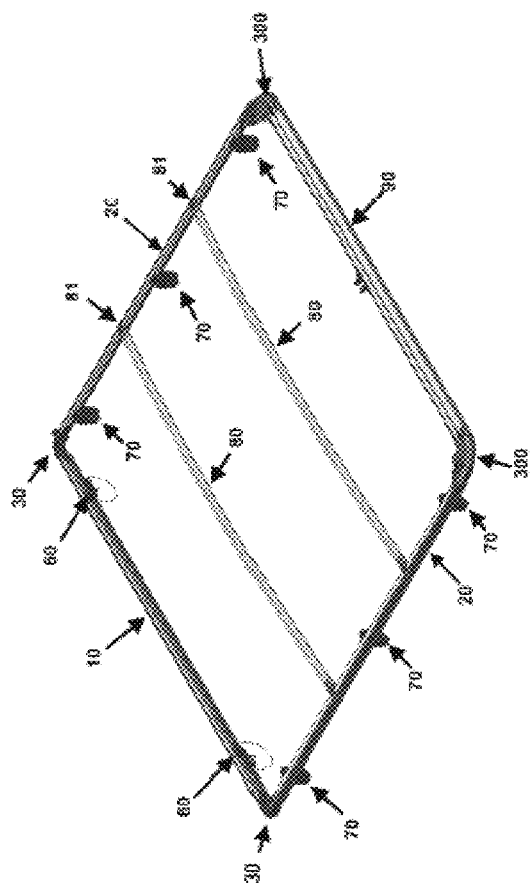
FIGS. 38 and 39 show the perspective and top view of the set of profiles assembled for the formation of the tarp, detailing its components and embodiment.
Figure 39:
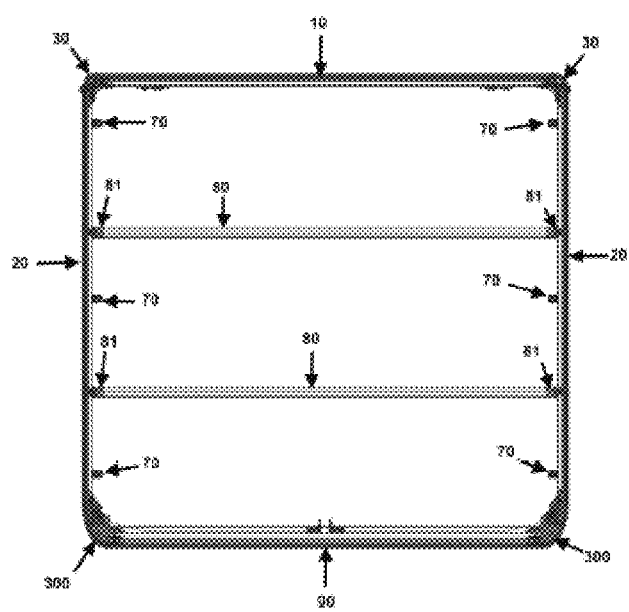

FIGS. 38 and 39 show the complete assembly of the tonneau cover profiles detailing the set as a whole.

The invention claimed is:

1. A tonneau cover fixing and assembly system, comprising:
a front profile (10) equipped with a first bas-relief (11) having a groove (111) that allows the sliding fit of a plastic front profile (41) fixed to a tarp (40), a lower projection (12) provided with a second groove (121) for fastening by sliding fit—of a front seal rubber (50), a second bas-relief (13) for fit fastening a seal rubber (131) sealing between the tonneau and a vehicle bed, a third bas-relief (14) equipped with flaps (141) allowing fixing structures (60) equipped with elastic cord (63) for fixing the tarp (40) when rolled up and at the ends of the front profile (10), along an upper portion of profile (10), holes (15) are arranged that allow a fitting of structural steel sections (30) through a click, said structure (60) which is provided with a first projection (61) that allows the sliding fit along the third bas-relief (14) of the front profile (10), a pair of flaps (62) for fixing the elastic cord-(63) in; a central portion of the front profile
side profiles (20) are provided with a fourth bas-relief (21) that has a third groove (211) for fixing side plastic profile (42) of the tarp (40), said side plastic profile (42) having a second projection (421) that allows the fitting together with the third groove (211) by pressure, in a lower portion of the side profiles (20) is arranged a fifth bas-relief (22) for fastening by fitting the sealing rubber (221), in a rear portion of the side profiles (20) a fourth groove (23) is arranged allowing the fixing of locking structures (70), from the tonneau cover to the vehicle bed and at ends of the side profiles (20), next to the upper portion, holes (24) are arranged for fitting with the structural steel sections (30) through click, the locking structure (70) which is provided with a first piece (71) having a second flap (711) that fits with the fourth groove (23) and a third projection (712) that fits with the second piece (72), the third projection (712) which has a first housing (713) for positioning a first nut when the locking structure (70) is screwed from below, and the second piece (72) has a spacing (721) for fitting the third projection (712) and a third flap (722) that allows locking with the vehicle bed, the third flap (722) having in a lower portion a second housing (723) for positioning a second nut when the locking structure (70) is screwed from above;

the structural steel sections (30), connecting the front profile (10) and the side profiles (20), have a fourth projection (31) that works as a snap-in guide and locking rod (311) equipped with a tooth that snaps together the hole (24) of the side profiles (20) through a click, a fifth projection (32) having a locking rod (321) provided with guides and a tooth that fits with a respective hole from the the hole (15) of the front profile (10) through one-click; and the tarp (40) is provided on its front portion with the plastic profile (41) and on its side portions with the side plastic profile (42), and the fixing of the plastic profile (41) and the second plastic profile (42) with the tarp (40) occurs by sewing a hem (43), the tarp (40) receives the provision of crossbars (80) supporting the tarp, the crossbars (80) which are provided with tips (81) sewn between a side face of the tarp (40) and the side plastic profile (42); on a rear portion of the tonneau cover a rear profile (90) is arranged provided with second structural steel sections (300) of specific format that allows the connection with the tips (201) of the side profiles (20), said second structural steel sections (300), which are provided with a locking structure (301), said second structural steel sections (300) that are connected to the rear profile (90) and the tips (201) connected to the side profiles (20), a pair of actuators (91) are positioned in pairs in a central portion of the rear profile (90), so that a total release of the system may occur by activating only one pair of the pair of actuators (91) or by activating any pair of actuators interconnected through a set of four rods (92A), (92B), (92C) and (92D) being two rods connected to the pins (93) and the other two rods connected between the pair of actuators (91), which allows a transmission of movement.

2. The tonneau cover fixing and assembly system, according to claim 1, wherein structure (60) comprises:

a second structure (65) provided with a side flap (64) for fixing the second structure (65) fixed to the opposite end of the elastic cord (63), the second structure (65) having a pair of flaps (651) that allow the elastic cord fixing and a tab (652) for positioning along the side flap (64).

3. The tonneau cover fixing and assembly system, according to claim 2, wherein—the structure (60) fixing the tarp (40) holding when rolled up, fitting the tab (652) of the structure (60) in a tab (34) of the structural steel sections (30).

4. The tonneau cover fixing and assembly system, according to claim 1, wherein the side profiles (20) allow fixing of the locking structures (70) of the tonneau cover with the fourth groove (23) in a sliding manner.

5. The tonneau cover fixing and assembly system, according to claim 1, wherein the first piece (71) and the second piece (72) are provided with an upper hole (73) that allows fixing and a junction between the parts using a bolt and nut above or below.

6. The tonneau cover fixing and assembly system, according to claim 5, wherein, when up tightening, the nut is placed in the second housing (723) located on the underside of the second piece (72).

7. The tonneau cover fixing and assembly system, according to claim 5, wherein, when down tightening, the nut is placed inside the first housing (713) which is located on a front part of the first piece (71).

8. The tonneau cover fixing and assembly system, according to claim 1, wherein the structural steel sections (30) has a fifth groove (33) with a fixing portion of the front profile (10) that aligns with the groove (111) in order to allow the sliding movement of the plastic profile (41) of the tarp (40), allowing removal of the tarp (40), when rolled up, with no need to disassemble the entire system.

9. The tonneau cover fixing and assembly system, according to claim 1, wherein the tips (81) have a fourth flap (811) that follows a shape of the side profiles (20) so that an end of the fourth flap (811) is hemmed with the tarp (40).

10. The tonneau cover fixing and assembly system, according to claim 1, wherein the actuators (91) are modular.

11. The tonneau cover fixing and assembly system, according to claim 1, wherein slots (36) are arranged in a lower portion of the structural steel sections (30) for positioning a piece (37) for locking the tarp (40), the piece (37) which is provided with holes (371) allowing fixing and positioning of the slots (36).

12. The tonneau cover fixing and assembly system, according to claim 1, wherein a sixth bas-relief (35) is arranged in a lower portion of the structural steel sections (30).

* * * * *